US005343769A

United States Patent [19]

Suovaniemi et al.

[11] Patent Number: 5,343,769

[45] Date of Patent: Sep. 6, 1994

[54] PROCEDURE FOR FILLING AND EMPTYING A PIPETTE, AND PIPETTE

[75] Inventors: Osmo Suovaniemi; Pertti Ekholm, both of Helsinki, Finland

[73] Assignee: Biohit Oy, Helsinki, Finland

[21] Appl. No.: 949,826

[22] PCT Filed: May 3, 1991

[86] PCT No.: PCT/FI91/00133

§ 371 Date: Dec. 30, 1992

§ 102(e) Date: Dec. 30, 1992

[87] PCT Pub. No.: WO91/16974

PCT Pub. Date: Nov. 14, 1991

[30] Foreign Application Priority Data

May 4, 1990 [FI] Finland .................................. 902267

[51] Int. Cl.5 .......................... B01L 3/02; G01N 1/14

[52] U.S. Cl. ............................... 73/864.18; 73/864.16

[58] Field of Search ........... 73/864.13, 864.16, 864.17, 73/864.18

[56] References Cited

U.S. PATENT DOCUMENTS

| | | | |
|---|---|---|---|
| 3,248,950 | 5/1966 | Pursell et al. | 73/864.18 |
| 3,915,651 | 10/1975 | Nishi | 222/333 X |
| 4,058,370 | 11/1977 | Souvaniemi | 73/864.16 |
| 4,224,281 | 9/1980 | Thieme et al. | 73/864.18 X |
| 4,345,483 | 8/1982 | Paletta et al. | 73/864.16 X |
| 4,567,780 | 2/1986 | Oppenlander et al. | 73/864.16 |
| 4,790,176 | 12/1988 | Marteau d'Autry | 73/864.18 X |
| 4,821,586 | 4/1989 | Scordato et al. | 73/864.18 |
| 4,896,270 | 1/1990 | Kalmakis et al. | 364/479 |
| 4,964,533 | 10/1990 | Allington et al. | 73/864.18 X |
| 4,988,481 | 1/1991 | Jarvimaki et al. | 73/864.18 X |
| 4,995,532 | 2/1991 | Knödel | 73/864.18 |

FOREIGN PATENT DOCUMENTS

| | | |
|---|---|---|
| 0250095 | 12/1987 | European Pat. Off. . |
| 77579 | 12/1988 | Finland . |
| 412859 | 3/1980 | Sweden . |

*Primary Examiner*—Tom Noland
*Attorney, Agent, or Firm*—Merchant & Gould

[57] ABSTRACT

A procedure for filling and emptying a pipette with quantative accuracy, wherein the distance travelled by a plunger (3) is measured as the plunger is being moved and the plunger is arrested when the travel corresponding to the desired quantity of liquid to be transferred has been reached, and a pipette comprising a elements (14, 23, 24) for measuring the travel of the plunger (3) and a elements (13) for controlling the movements of the plunger.

4 Claims, 3 Drawing Sheets

PROCEDURE FOR FILLING AND EMPTYING A PIPETTE, AND PIPETTE

BACKGROUND OF THE INVENTION

1. Field of the Invention

The present invention concerns a procedure for filling and emptying a pipette with volumetric exactitude. The invention further concerns a pipette.

2. Description of the Related Art

In the art such pipettes are known for handling liquids, e.g. for liquid transfer, dilution, dispensing, mixing, titration etc., in which the plunger is operated either manually or with a particular mechanical contrivance, such as an electric motor.

In electrically operated single and multiple passage pipettes, the problem is their fairly bulky size, resulting from the large size of the requisite electric motor, e.g. a step motor or DC motor, and from the large size of the current source which this motor requires. Furthermore, the size of the pipette is increased, and its construction made complex, by the electronics needed to regulate and operate the pipette. The complex electronics moreover introduces a risk of malfunction which cannot be ignored. Furthermore, pipettes of prior art do not meet all requirements as regards dispensing accuracy and reproducibility.

The object of the present invention is to eliminate the drawbacks just mentioned. Particularly, the object of the invention is to provide a novel procedure for filling and emptying a pipette with higher quantitative accuracy than before, and a pipette which is simple in design, yet at the same time accurate and offering many different modes of use.

Regarding the features characterizing the invention, reference is made to the Claims section.

SUMMARY

In the procedure of the invention, the desired liquid quantity is transferred, making use of pressure in a cylinder space produced with the aid of a cylinder/plunger combination, into, respectively out from, a liquid volume. As taught by the invention, the travel of the plunger is measured as the plunger is being moved, that is when liquid is being moved into or out from the liquid volume, this distance travelled by the plunger being proportional to the quantity of liquid transported, and the plunger is arrested when the travel is consistent with the predetermined liquid quantity to be transferred. The plunger is advantageously stopped with the aid of a brake means.

In an embodiment of the invention, the plunger is moved with the aid of a threaded rod and/or sleeve, measuring the rotation of this threaded element. The plunger can be stopped by the aid of a brake means acting on the threaded rod and/or sleeve. The distance travelled by the plunger can be found from the rotation.

The means of the invention for liquid handling comprises a cylinder volume; a plunger which has been fitted into the cylinder volume to be reciprocatingly movable; a liquid volume communicating with the cylinder volume; an operating means for moving the piston in order to fill and empty the liquid volume of the pipette at least in part with quantitative exactitude by moving the plunger. As taught by the invention, the pipette comprises a measuring means for measuring the plunger travel and a control means for controlling e.g. the operating means and, by its mediation, the plunger movements. The control means may comprise a data processing unit, such as a microprocessor. The operating means advantageously comprises a brake means arranged to arrest the plunger by control from the control unit with quantitative exactitude in conformity with the desired filling or emptying volume.

In am embodiment of the invention, the operating means comprises a threaded rod and sleeve assembly, and a power means. The power means is advantageously disposed to rotate one element of the threaded rod and sleeve combination, and the other element is connected to the plunger in order to move the plunger. The measuring means may be disposed to measure the rotation of the threaded rod and the sleeve relative to each other. The measuring means may comprise a detector for detecting the rotation of the rotatable part of the threaded rod and sleeve assembly, on the basis of this rotation being determined e.g. the travel of the linearly moving part and of the plunger.

In an embodiment of the invention, the brake means comprises arresting stations positioned circumferentially around the rotatable part of the threaded rod and sleeve assembly and an arresting member, e.g. of latch type, arranged to move into arresting position by control from the control means.

In an embodiment of the invention, the detector comprises a plurality of register stations placed on the rotatable part of the threaded rod and sleeve assembly, and one or several, e.g. fixed, sensors to register the register stations, and thereby to determine the plunger position. The sensors of the measuring means are e.g. optical or magnetic sensors by which it is possible to measure and determine the position of the rotatable part, the travel, travelling velocity and/or acceleration of the part of the threaded rod and sleeve assembly which moves, linearly for instance, the plunger, and the corresponding plunger travel, and further the liquid quantity transported. For the sensors, various kinds of register stations, depending on the kind of sensor, may be placed on the rotatable part of the threaded rod and sleeve assembly, e.g. spots or stripes of various colours, by which the sensor registers the rotation of the rotatable part and its position at any given time.

In an embodiment of the invention, the arresting stations of the brake means are notches on the circumference of the rotatable part of the threaded rod and sleeve assembly, and the arresting member is a shoulder that can be pushed into a notch by means of an actuator.

The procedure of the invention presents the advantage that transfer and/or dispensing or sampling of liquid quantities, especially of small liquid quantities, can be implemented with very high accuracy and in an action carried out with exactitude.

Furthermore, the means of the invention presents the advantage of simple design and, further as a result thereof, small size and reliable operation of the means.

BRIEF DESCRIPTION OF THE DRAWINGS

In the following the invention is described in detail, referring to the attached drawing, wherein.

DESCRIPTION OF THE PREFERRED EMBODIMENT

Figure 1:
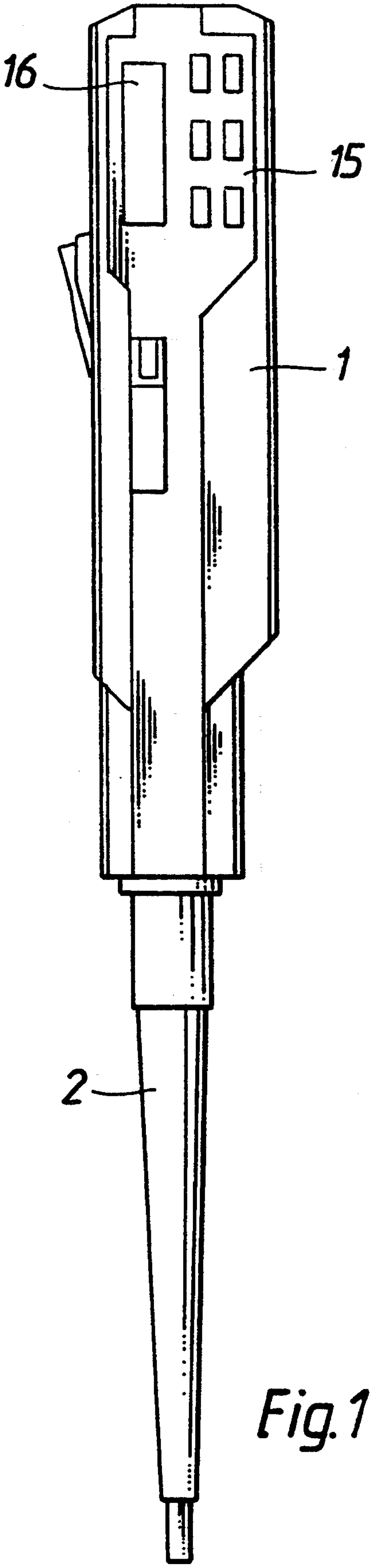
FIG. 1 presents a pipette according to the invention.
Figure 2:
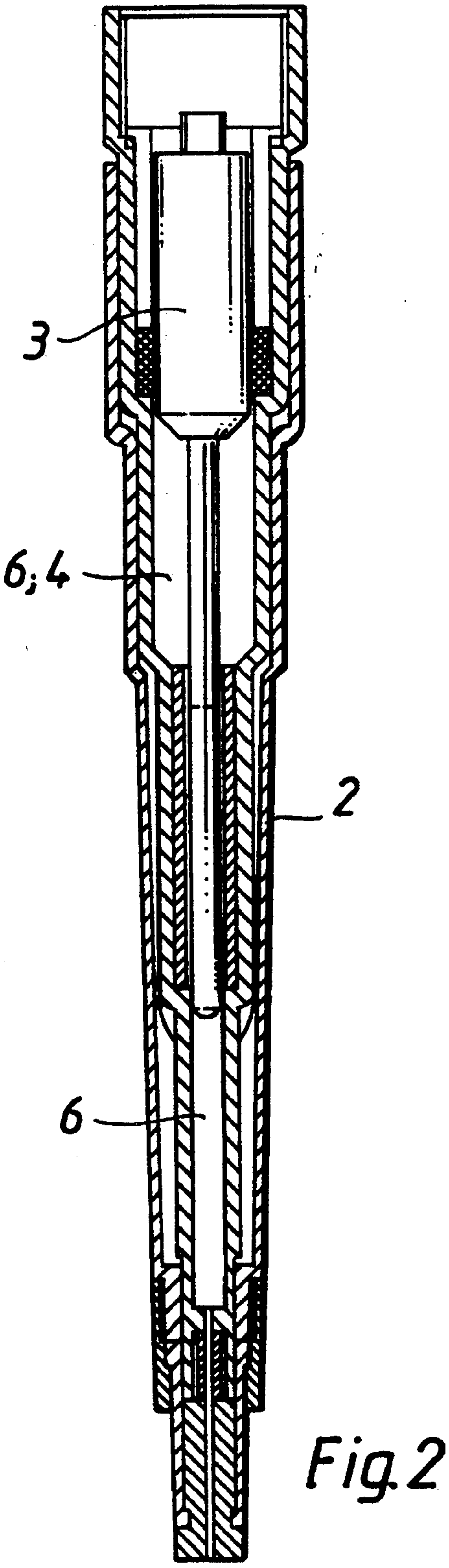
FIG. 2 presents the tip portion of the pipette of FIG. 1.
Figure 3:
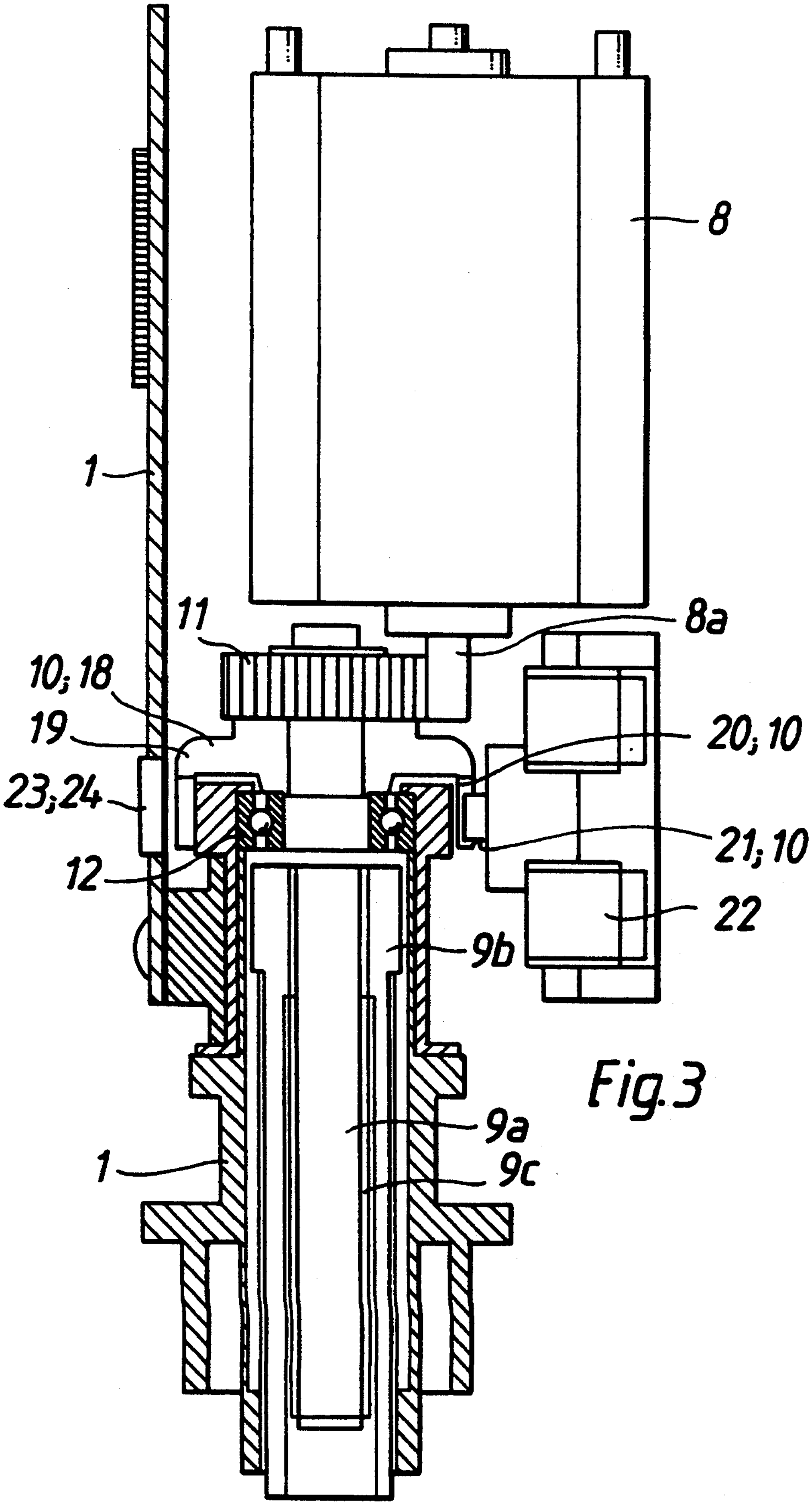
FIG. 3 presents, in part, the body part of the pipette of FIG. 1, opened.

The pipette of the invention presented in general in FIG. 1, and partly in greater detail in FIGS. 2–3, comprises a body part 1 with tip portion 2 and with tip piece (not depicted). The body and tip portion have been joined together e.g. by a threaded juncture in FIG. 1. The pipette comprises a cylinder volume 3 and a plunger 4, fitted into the cylinder volume. The liquid passage 5 in the tip portion 2 and the cylinder volume constitute the liquid volume of the pipette.

The pipette further comprises an operating means 8,9,9*a*,9*b*,9*c* for moving the plunger 4 in the cylinder volume 3, and a control means 13 for controlling the operating means and by its mediation, the movements of the plunger.

The operating means comprises a power means, such as an electric motor 8 and a threaded rod and sleeve assembly 9*a*, 9*b*, and a brake means 10. The rotating shaft 8*a* of the electric motor 8, e.g. a d.c. motor, is connected e.g. by a friction coupling 11, with the rotatable part of the threaded rod and sleeve assembly 9*a*,9*b*, in the present instance the threaded rod 9*a*. The threaded rod 9*a* is carried with the aid of a bearing 12 in the body part 1. The linearly moving component of the threaded rod and sleeve assembly, in the present instance the threaded sleeve 9*b*, moves by action of the matched threads 9*c* of the assembly, in the direction of the threaded rod's axis, when the electric motor 8 rotates the rotatable part 9*a* of the assembly. The linearly moving part of the assembly, that is the threaded sleeve 9*b*, is connected with the plunger 4 in order to move same. The movement of the threaded rod 9*a* and the threaded sleeve 9*b*, and at the same time the movement of the plunger 4, can be arrested with the aid of the brake means 10.

With the rotatable part of the threaded rod and sleeve assembly, in the present instance the threaded rod 9*a*, is connected a wheel 18 presenting a number of radial vanes 19 and notches 20 therebetween. The arresting stations of the brake means 10 have been formed of the notches 20 of this wheel 18. The brake means 10 further comprises an arresting member 21, which is a shoulder or another latch-like member, and an actuator 22 with the aid of which the arresting member 21 can be pushed into a notch 20 of the wheel 18. The actuator 22 is a means operating e.g. electromagnetically, such as with the aid of a solenoid, and by the aid of which the arresting member 21 is pushed towards the axis of rotation in between the vanes 19 of the wheel in order to arrest the movement of the wheel 18, and further that of the threaded rod 9*a*, the threaded sleeve 9*b* and the plunger 4.

Figure 4:
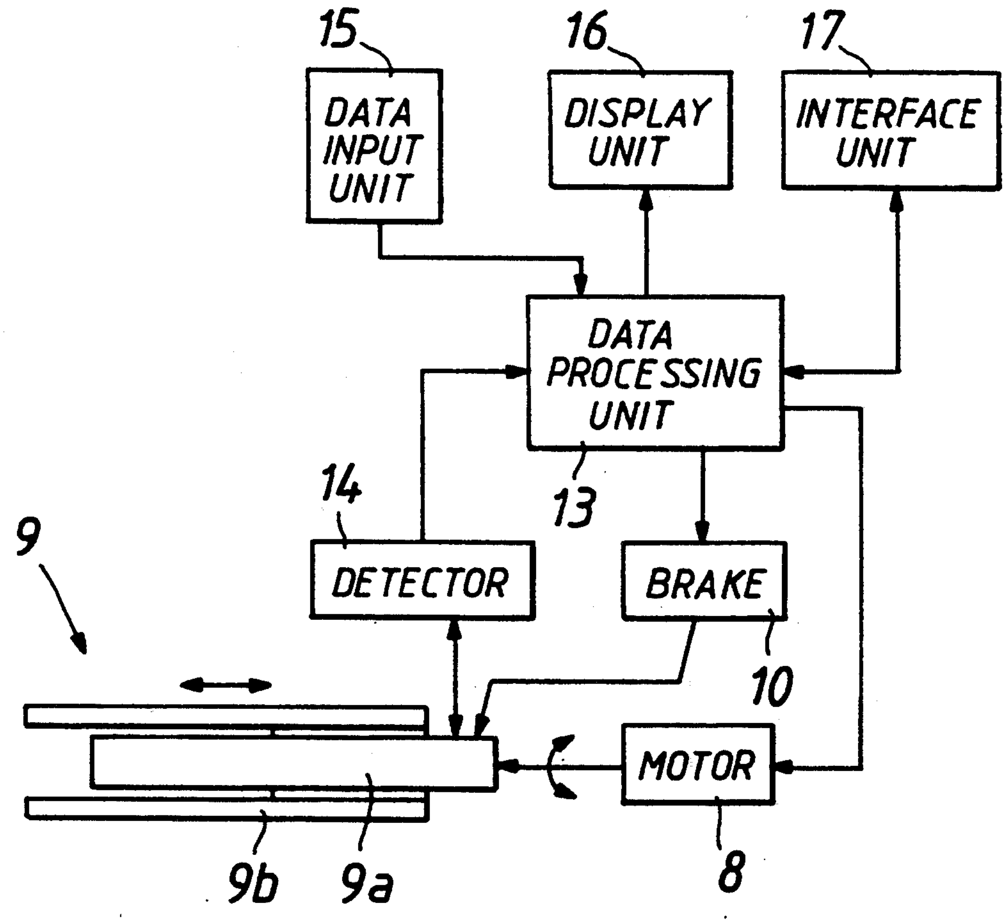
FIG. 4 presents as a block diagram, the structure of the pipette of the invention.

In FIG. 4 is seen a block diagram of the means. The control means 13 comprises a data processing unit, such as a microprocessor. The means further comprises a measuring means 14 for measuring the position and/or movement of the plunger 4. The data processing unit comprises a central unit and at least one memory unit in which the instructions for controlling the operating means are stored, as well as the parameters of the measuring means for the forming of control signals corresponding to any desired filling and emptying volumes, such as the cross section area of the cylinder volume 4, and the requisite calculating instructions. The measuring means 14 includes a detector, with the aid of which the rotation of the threaded rod 9*a* is detected, e.g. in units of angle of rotations or in full turns. The measuring means 14 also comprises means for giving off a measurement signal, in an appropriate form. The measuring means 14, brake means 10 and electric motor 8 are suitably joined with the control means 13.

The pipette further comprises a data input means 15, such as a keyboard, a display 16 and an interface 17. The data input means 15 is used to supply data or instructions to the control means 13, particularly the data processing unit. The display 16 is used to display the data which are put in and/or such action as has been performed, etc. The interface 17 enables the control means, and in particular the data processing unit 13, to be connected to apparatus external to the liquid handling means, e.g. for data transfer or processing.

The detector of the measuring means 14 comprises a number of registering stations arranged in conjunction with the threaded rod 9*a*, and one or several fixed sensors for monitoring these registering stations. In FIG. 3, the registering stations have been implemented with the aid of a wheel 18, and the sensors consist of two side-by-side optical sensors 23,24, disposed close to the circle which the tips of the vanes 19 on the wheel 18 constitute, mounted on the supporting structures of the first body part. The optical sensors 23,24 send out pulsed signals, as the incident illumination fluctuates, being reflected in alternation e.g. from the dark vanes 19 of the wheel 18 and from the surface of the supporting structure, which presents for instance a mirror-like finish. It is also possible to provide adjacent to the optical sensors 23,24, a light source, and the signal from this light source may be arranged to be chopped by the vanes 19 on the wheel 18.

The means of the invention operates as follows. The voltage supplied to the d.c. motor 8 is regulated with the aid of the control means 13 and over the control circuit of the motor 8, in such manner that the frequency of the pulsed signal from sensors 23,24 corresponds to the desired initial acceleration of the plunger and, thereafter, to the target speed when liquid is being drawn into the liquid volume 6 or dispensed from the liquid volume 6. The measuring signal pulses are continuously counted in the control means 13. When the count approaches the total number of pulses corresponding to the desired dispensing volume, terminal deceleration of the plunger 4 is commenced, for instance by reducing the voltage that is supplied to the motor 8. When the number of pulses consistent with the desired dispensing volume is reached, the voltage is disconnected from the motor 8 and the actuator of the brake means 10 receives the command to push the arresting member 21 into the notch 20 of the wheel 18. The vane of the wheel 18 hits against the arresting member 21 and the motor 8, as it decelerates, urges by mediation of the friction coupling 11 the vane 19 of the wheel 18 against the arresting member 21. When the motor 8 has come to complete standstill, the friction of the threaded rod will prevent the vane 19 of the wheel 18 from rotating out of contact with the arresting member 21.

The distance which the plunger 4 travels is proportional to the rotation of the threaded rod 4, which is thus measured with the measuring means 14. The travel is proportional to the volumetric movement, which is equivalent to the liquid volume 6, or to the volumetric quantity of the liquid transferred out of this volume.

The plunger 4 is stopped at once as soon as the distance of travel corresponding to the desired, predetermined liquid quantity has been reached.

The coupling of the electric motor 8 with the threaded rod 9*a* is advantageously implemented by means of a friction coupling 11. This coupling is able to absorb the rotational energy of the motor 8 after the stopping caused by the brake means. By joint action of the stopping motor and the friction coupling, the vane of the wheel remains, in reproducible manner, resting against the arresting member. The angle at which the wheel stops is accurately defined and the point at which the plunger stops, even more accurately in accordance with the step-down determined by the pitch of the threads on the rod and sleeve.

In the liquid ejecting stage, the motor 8 is run in opposite direction, according to the same principle. In simple dispensing, and in the last step of serial dispensing, in order that complete removal of liquid from the liquid volume 6 might be ensured, the movement of the plunger goes on farther past the point where it started in the suction phase (secondary movement). Stopping may be accomplished either by the aid of the brake means already described, or with a mechanical limit stop, by which can be ensured that the reference point of the movement does not creep during operation. On completed secondary movement the plunger is returned to its initial position, using the brake means. In serial dispensing (when the liquid quantity that has been taken in is dispensed out in several smaller parts), expulsion of a partial dose is terminated using the arresting member. This makes the liquid flow break off accurately and reproducibly.

In the pipette advantageously two optical sensors 23 and 24 are used, which are located side by side in peripheral direction, in which case the information furnished by these sensors enables not only the speed of rotation of the wheel to be inferred but also the direction in which the wheel rotates. The information obtained from the sensors 23,24 can be applied in regulating the supply voltage of the motor in order to achieve the desired speed of rotation and to maintain it, independent of the load. Such control can be accomplished e.g. directly by altering the voltage or by interrupting the voltage at a pace so fast that the motor speed cannot change in step with this chopping and, instead, conforms to the average voltage. Furthermore, the velocity profiles of the plunger during liquid transfer can be set to be optimal, including initial acceleration, constant speed and terminal deceleration.

Figure 5:
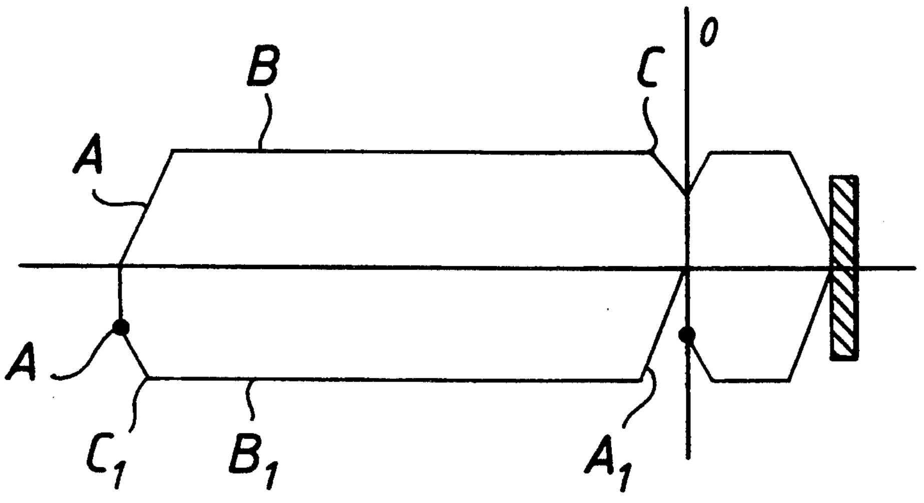
FIG. 5 illustrates, graphically, the filling and emptying of the pipette of FIG. 1.

In FIG. 5 is graphically presented the fundamental mode of operation of the pipette of the invention. Intake aspiration during the acceleration step A1, suction rate is accelerated to constant level B1, which is maintained until close to C, the desired intake volume. At C, deceleration of the motor is commenced, and when the desired intake volume has been reached, suction is stopped with the aid of the brake means at D1. Similarly, liquid dispensing is started with an acceleration step A up to the desired constant dispensing level B, and this is maintained until close to the endpoint C. At this stage, deceleration of the motor is commenced, which is terminated at the time O. If desired, a secondary step can be adjoined to the operation (in FIG. 5 to the right of the 0 level), with which in the dispensing process is associated acceleration of the motor, a uniform dispensing step and finally deceleration and termination of movement. In the filling operation, there is similarly at first an acceleration step, then a uniform suction step, which terminates in deceleration and termination by braking.

The terminal deceleration is useful for the reason that owing to the tapering shape of the pipette's tip portion the velocity at which the level of the liquid discharges from the tip rises to very great height towards the end if the piston moves at uniform velocity, and because of this high velocity some liquid may remain on the inner surface of the liquid volume 6.

The powerful deceleration caused by the abrupt stopping results in a clean, and reproducible, break of the liquid column discharging from the liquid volume 6 exactly at the end of the tip piece, without causing any droplets to cling to its outside surface.

In the foregoing the invention has been described by way of example with the aid of the attached drawing, while different embodiments of the invention are feasible within the scope of the inventive idea delimited by the claims.

What is claimed is:

1. A pipette comprising: a cylinder volume (4); a plunger which is fitted into said cylinder volume, said plunger being reciprocatingly movable within said cylinder volume; a liquid volume (6) communicating with said cylinder volume; operating means (8,9*a*,9*b*) for moving said plunger in said cylinder volume and for filling and emptying said pipette with quantitative accuracy when said plunger is moved, said operating means including a threaded rod and sleeve assembly in communication with said plunger; measuring means (14,23,24) for measuring the distance travelled by said plunger; control means (13) for controlling the movement of said plunger; and brake means (21) for arresting said plunger, said brake means acting on said threaded and sleeve assembly, said brake means being operatively connected to said control means.

2. The pipette of claim 1, wherein said threaded rod (9*a*) and sleeve (9*b*) assembly of said operating means additionally includes a rotatable component; and said operating means additionally comprises a power means (8), said power means (8) being disposed in communication with said rotatable component to rotate said threaded rod and sleeve of said assembly relative to each other, said threaded sleeve being connected to said plunger in order to move said plunger with the aid of said threaded rod; that said measuring means (14,23,24) is arranged to measure the rotation relative to each of said threaded rod and sleeve, so that on the basis of said rotation, the distance travelled by said plunger is determined; said brake means (21) further comprising arresting stations disposed peripherally around said rotatable component of said threaded rod and sleeve assembly, said arresting stations for receiving an arresting member (10), said arresting member being controlled by said control means.

3. The pipette of claim 2, wherein said measuring means additionally comprises a sensor (23,24), said sensor in communication with registering stationed disposed on said rotatable component of said threaded rod (9*a*) and sleeve (9*b*) assembly, said registering stations for determining the position of said plunger on the basis of the rotation of said threaded rod and sleeve.

4. The pipette of claim 2, wherein said arresting stations (20) of said brake means include notches in the circumference of said rotatable component of said threaded rod and sleeve assembly, and said arresting member (10) further includes a shoulder, said shoulder for being pushed into one of said notches with an actuator (22).

* * * * *

UNITED STATES PATENT AND TRADEMARK OFFICE
CERTIFICATE OF CORRECTION

PATENT NO. : 5,343,769

DATED : September 6, 1994

INVENTOR(S) : Suovaniemi, et al.

It is certified that error appears in the above-identified patent and that said Letters Patent is hereby corrected as shown below:

In column 6, line 56 (line 3 of claim 3), "stationed" should be --stations--.

Signed and Sealed this

Twenty-sixth Day of September, 1995

*Attest:*

BRUCE LEHMAN

*Attesting Officer*

*Commissioner of Patents and Trademarks*